United States Patent [19]

Olstowski

[11] 3,773,697

[45] Nov. 20, 1973

[54] PROCESS FOR PREPARING RAPID-SETTING NON-CELLULAR POLYURETHANES

[75] Inventor: Franciszek Olstowski, Freeport, Tex.

[73] Assignee: The Dow Chemical Company, Midland, Mich.

[22] Filed: June 5, 1972

[21] Appl. No.: 259,838

[52] U.S. Cl. ........ 260/18 TN, 260/28, 260/28.5 AS, 260/30.2, 260/30.4 R, 260/30.6 R, 260/31.2 R, 260/31.4 R, 260/31.8 R, 260/33.2 R, 260/33.6 UB, 260/33.8 UB, 260/37 M, 260/37 R, 260/75 NE, 260/77.5 AA, 260/77.5 AP, 260/77.5 R, 260/858, 260/859 PV, 260/859 R, 264/28, 264/237, 264/DIG. 77
[51] Int. Cl. .............................................. C08k 1/66
[58] Field of Search............... 264/54, 237, DIG. 77, 264/331, 28; 260/18 TN, 77.5 AP, 77.5 AX, 77.5 AA, 77.5 A, 75 NE, 75 NA, 31.8 R, 28.5 AS, 30.2, 30.4 R, 30.6 R, 31.2 R, 31.4 R, 31.8 R, 33.2 R, 33.6 UB, 33.8 UB, 37 M, 37 R, 859 R, 859 PV, 858

[56] References Cited
UNITED STATES PATENTS 3,378,511   4/1968   Newton ..................... 260/77.5 AP
3,265,784   8/1966   Jacobs ................................ 264/237

*Primary Examiner*—Donald E. Czaja
*Assistant Examiner*—Gary R. Marshall
*Attorney*—William M. Yates et al.

[57] ABSTRACT

Instant set polyurethane castings are prepared by mixing a polyol having a functionality of 2-8 and an equivalent weight of from 31 to 150, an organic polyisocyanate, an organo metallic catalyst, and a modifier which can be either a liquid or a solid or a mixture of both. The amount of modifier present is from 0–18 percent by weight of the combined weights of all the components of the system excluding the catalyst. This mixture is poured into a mold and then within 30 seconds after solidification, the resultant casting is quenched with a fluid at a temperature of from about 25°C down to about −100°C.

9 Claims, No Drawings

PROCESS FOR PREPARING RAPID-SETTING NON-CELLULAR POLYURETHANES

This invention relates to a process for preparing rapid-setting polyurethanes.

Rapid-setting polyurethanes have been prepared in the presence of plasticizers or modifiers, such as in U.S. Pat. 3,378,511 and in copending application Ser. No. 179,149, filed on Sept. 9, 1971, for NON-ELASTOMERIC POLYURETHANE COMPOSITIONS.

It has now been discovered that rapid-setting polyurethanes having at least one dimension less than about three-fourths inch can be prepared in the absence of such modifiers or in the presence of lesser quantities of such modifiers.

The process of the present invention comprises
A. admixing a composition comprising
 1. a polyether polyol having an average functionality of from about 2 to about 8 and an equivalent weight of from about 31 to about 150 and preferably from about 53 to about 130,
 2. an organic polyisocyanate,
 3. from 0 to about 18 percent by weight based upon the combined weights of (1), (2) and (3) of a compound selected from
  a. a liquid modifier compound having a boiling point of at least about 150°C, and
  b. a solid modifier compound having a surface area less than about 0.1 m² /gram and
  c. mixtures thereof,
 4. an organometallic catalyst; wherein the quantities of (1) and (2) are such as to provide an NCO:OH ratio of from about 0.8:1 to about 1.5:1 and preferably from about 0.9:1 to about 1.2:1 with the proviso that when the average functionality of components (1) or (2) is about 2, then the average functionality of the other component is at least about 2.5; with the further proviso that when component (1) consists solely of an amine initiated polyether polyol no catalyst is required;
B. rapidly pouring the mixture into a suitable thin walled mold (i.e., an average thickness of from about 0.05 to about 5 and preferably from about 0.1 to about 2.0 mm) whereupon the composition rapidly solidifies, and
C. quenching the solidified composition within less than about 30 seconds and preferably about 10 seconds after solidification has occurred by contacting the composition or the mold containing the composition with a cooling fluid for a time sufficient to prevent undesirable swelling and/or distortion, usually for from about 30 to about 240 and preferably from about 45 to about 180 seconds.

The process of the present invention provides for rapid setting polyurethane compositions which usually possess an improvement in one or more of the physical properties such as, for example, tensile strength, fluxural modulus, hardness and the like over those rapid setting polyurethanes which contain at least 25 percent modifier. The property improvement is generally greatest when no modifier is present.

By the term "rapid-setting" employed herein it is meant that the compositions will solidify within about 60 seconds after catalyst addition without the employment of external sources of heat.

Suitable polyols which are employed in the present invention as component (1) include hydroxyl initiated and amine initiated polyether polyols and mixtures thereof.

Suitable hydroxyl initiated polyether polyols include the oxyalkylated derivatives of a polyhydric compound having 2 or more reactive hydroxyl groups such as, for example, ethylene glycol, propylene glycol, glycerine, trimethylol propane, pentaerythritol, sucrose, mixtures thereof and the like.

Suitable amine initiated polyether polyols include the oxyalkylated derivatives of an amine compound such as, for example, ammonia, ethylenediamine, propylenediamine, 1,6-hexane-diamine, diethylenetriamine, triethylenediamine, tetraethylene-pentamine, mixtures thereof and the like.

Suitable oxyalkylating agents which are reacted with the hydroxyl-containing or amine-containing compounds or mixtures thereof, include, for example, such vicinal epoxides as ethylene oxide, propylene oxide, 1,2-butylene oxide, 2,3-butylene oxide, epichlorohydrin, epibromohydrin, styrene oxide, butylglycidyl ether, phenylglycidyl ether, mixtures thereof and the like.

When mixtures of polyether polyols are employed, any of the polyols can have an individual average equivalent weight above about 150 provided that the average equivalent weight of the mixture is between about 31 and about 150 and preferably from about 53 to about 130.

Also, when component (1) consists solely of an amine initiated polyether polyol, no catalyst is required.

Suitable polyisocyanates which are employed as component (2) in the process of the present invention include, for example, any organic polyisocyanate having 2 or more NCO groups per molecule and no other substituents capable of reacting with the hydroxyl groups of the polyol. Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g., Hylene W) naphthalene diisocyanate, dianisidine diisocyanate, polymethylene polyphenylisocyanate, mixtures of one or more polyisocyanates and the like.

Other organic isocyanates which may suitably be employed and which are to be included in the term organic polyisocyanate include isocyanate terminated prepolymers prepared from the previously mentioned polyols, preferably the polyether polyols, and the above mentioned polyisocyanates.

Suitable liquid modifier compounds which can be employed as component (3a) include, for example, polyoxyalkylene compounds, organic phosphates, organic phosphites, organic phosphonates, fatty acids, fatty oils, cyclic ethers, aromatic compounds, partially hydrogenated aromatic compounds, organic carbonates, halogenated aliphatic compounds, cyclic sulfones, esters of carboxylic acids and mixtures thereof, provided they have boiling points at atmospheric pressure above about 150°C.

Suitable polyoxyalkylene compounds which may be employed as the liquid modifier compound (Component 3a) include, for example.
 1. a liquid, totally-capped or non-hydroxyl-containing block or randomly formed polyoxyalkylene glycol represented by the general formula

I.

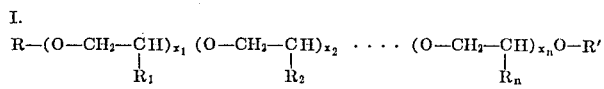

wherein R and R' are independently selected from saturated and unsaturated hydrocarbon groups having from about 1 to about 6, preferably from about 1 to about 3, carbon atoms, $R_1, R_2, \ldots$ and $R_n$ are independently hydrogen, an aryl group, an alkyl group or haloalkyl group, and alkyl or haloalkyl group having from about 1 to about 2 carbon atoms with the proviso that when $R_1, R_2, \ldots R_n$ is a haloalkyl group, it is present in minor amounts i.e. a ratio of from about 0 to about 10 percent of the total $R_1, R_2, \ldots R_n$ groups, and $x_1, x_2, \ldots x_n$ are integers, such that the boiling point of the liquid capped polyalkylene glycol is above about 150°C;

2. a liquid partially capped, block or randomly formed polyoxyalkylene compound represented by the general formula

II.

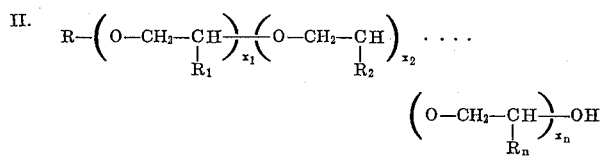

wherein R and $R_1, R_2 \ldots R_n$ are as defined in formula I above and $x_1, x_2, \ldots x_n$ are integers, the sum of which provides the partially capped polyoxyalkylene compound with a molecular weight of at least about 700;

3. a liquid, block or randomly formed polyoxyalkylene glycol represented by the general formula

III.

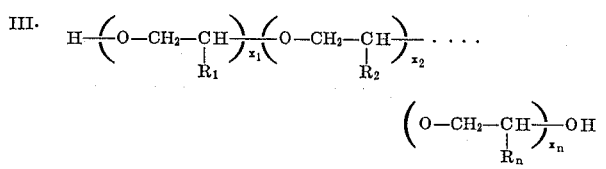

wherein $R_1, R_2 \ldots R_n$ are as defined in formula I above and $x_1, x_2 \ldots x_n$ are integers, the sum of which provides the polyoxyalkylene glycol with an equivalent weight of at least about 700, and 4. a liquid, random or block polyoxyalkylene polyol having a hydroxyl functionality of from 3 to about 8 represented by the general formula

IV.

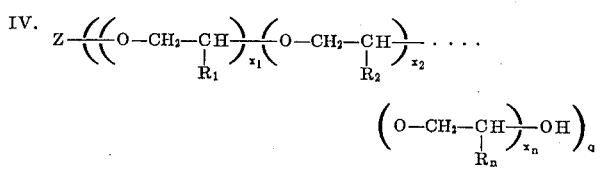

wherein $R_1, R_2 \ldots R_n$ are as defined in formula I above, Z is the residue of an initiator compound having from 3 to about 8 hydroxyl groups, $x_1, x_2, \ldots x_n$ are integers, the sum of which provides the polyoxyalkylene polyol with a hydroxyl equivalent weight of at least about 500 and $q$ is an integer having a valve of from 3 to about 8.

Suitable ester-modified polyoxyalkylene compounds which may be employed as the liquid modifier compound (Component 3a) include, for example, those liquid ester-modified polyethers having a boiling point above about 150°C represented by the general formula

V.

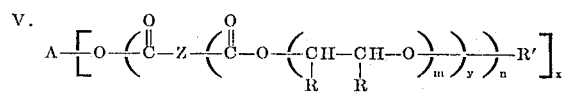

wherein A is the residue of an initiator or starting compound having from 1 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, m has an average value of from about 1.0 to about 2.0, n has a value from about 1 to about 5, x has a value from about 1 to about 8 and y has a value of 1 or 2 and wherein said ester-modified polyether compound has a hydroxyl equivalent weight above about 500 when 3 or more hydroxyl groups are present and when 2 hydroxyl groups are present, an average equivalent weight of above about 700 and when zero or one hydroxyl group is present a molecular weight of above about 700.

Suitable initiators which may be employed to prepare the liquid polyoxyalkylene and ester-modified polyoxyalkylene modifier compounds (Compound 3a) employed in the present invention include compounds having from 1 to about 8 hydroxyl groups such as for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier compound, Component 3a, is an ester modified polyether polyol, the initiator compound may also be and is preferably an adduct of the above mentioned initiator compounds and one or more of the following vicinal epoxide-containing compounds, i.e., the initiator compound is a polyoxyalkylene compound having 1 to 8 hydroxyl groups, preferably 2 to about 3 or 4 hydroxyl groups.

Suitable vicinal epoxide compounds which may be reacted with the above mentioned initiator compounds to prepare the modifier compounds (Component 3a) employed in the present invention include, for example, ethylene oxide, 1,2-propylene oxide, 1,2-butylene oxide, 2,3-butylene oxide, epichlorohydrin, epibromohydrin, epiodohydrin, styrene oxide, mixtures thereof and the like.

The liquid modifier compounds represented by formulae I-IV and methods for their preparation are well known in the art, e.g. U.S. Pat. Nos. 2,448,664; 2,425,755; 2,782,240 and 2,520,611. Methods for the preparation of the liquid modifier compounds represented by the formula V are given in a copending application Ser. No. 67,233, filed Aug. 26, 1970 by Robert W. McAda, Jr. for ESTER-MODIFIED POLYETHER POLYOLS and in U.S. Pat. No. 3,502,601.

Suitable aromatic compounds which may be employed as the liquid modifier compound having a boiling point above about 150°C in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro 4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodebenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and having boiling points at atmospheric pressure above about 150°C.

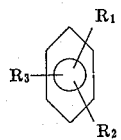

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which may be employed as the liquid modifier compound in the present invention include multi-ring compounds having a boiling point above about 150°C such as, for example, 1-chloro-naphthalene, 1-bromo-naphthalene, mixtures thereof and the like.

Suitable partially hydrogenated multi-ring aromatic compounds having a boiling point above about 150°C which may be employed as the liquid modifier compound in the present invention include, for example, 1,4-dihydronaphthalene, 1,2,3,4-tetrahydronaphthalene, mixtures thereof and the like.

Suitable organophosphorus compounds which may be employed as the liquid modifier compound include, for example, organo phosphates, organo phosphites and organo phosphonates having boiling points above about 150°C.

Organo phosphates, phosphites and phosphonates which may be employed as the liquid modifier compound include those liquid compounds represented by the formulae

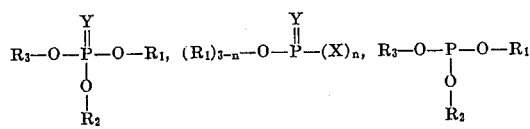

and

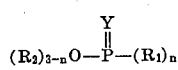

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, $n$ has a value of 1 or 2. Suitable such compounds include, for example, tri-n-butyl phosphate, triethylphosphate, tricresylphosphate, tris-(beta-chloroethyl)phosphate, tris-(2,3-dibromopropyl)phosphate, butyl dichlorophosphate, 2-chloroethyl dichlorophosphate, ethyl dichlorophosphate, diethyl fluorophosphate, bis (2-chloroethyl) fluorophosphate, dibutyl chlorophosphate, isoamyl dichlorothionophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris (2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

The organo phosphorus compounds may be prepared by procedures described in ORGANO-PHOSPHORUS COMPOUNDS, G. M. Kosolapoff, John Wiley & Sons, Inc., 1950.

Suitable liquid organic carbonates which may be employed as the liquid modifier in the present invention include the acyclic and cyclic carbonates represented by the formulae

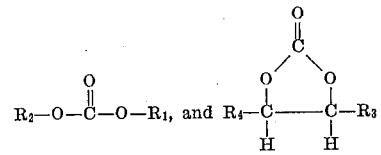

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which may be employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U. S. Pat. No. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which may be employed as the liquid modifier include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150°C may be employed as the liquid modifier in the present invention including cyclic polyethers prepared from butylene oxide, epichlorohydrin and the like.

The liquid cyclic polyether modifier compounds can be prepared by procedures mentioned in CYCLIC POLYETHERS AND THEIR COMPLEX WITH METAL SALTS by C. J. Pedersen, J. Am. Chem. Soc., Vol. 89, p. 7017-7036. 1968, TWELVE-MEMBERED POLYETHER RINGS. THE CYCLIC TETRAMERS OF SOME OLEFIN OXIDES by R. S. Kern, *J. Org. Chem.*, Vol. 33, p. 388–390, 1968, British Pat. Nos. 785,229 and 1.108.921. 1,108,921.

Suitable halogenated aliphatic compounds having a boiling point above about 150 C which may be employed as the modifier compound in the present invention include, for example, such chlorinated aliphatic compounds as hexachlorobutadiene, tetrachlorobutadiene, 1,2,3,3-tetrachlorobutane, 1,2,3-trichloropropene, polyepichlorohydrin diol having an equivalent weight above about 700 up to about 4,000, chlorinated paraffins, e.g., CHLOROWAX No. 40, 1-mercapto-3-chloropropanol-2, 3-chloropropane-1,2-diol, 2-chloropropane, 1,3-diol, 1,3-dichloro-2-propanol, mixtures thereof and the like.

Suitable cyclic sulfones which may be employed as the liquid modifier compound include the 5-membered cyclic sulfones such as, for example 3-methylsulfolane (3-methyltetrahydrothiophene-1,1-dioxide) and the like.

Suitable fatty acids and naturally occurring fatty oils which may be employed as the liquid modifier compounds (component 3a in the present invention includes, for example, oleic acid, linoleic acid, linolenic acid, and the like. The fatty acids resulting from the hydrolysis of naturally occurring oils of animal and vegetable origin including for example, linseed oil, castor oil, tung oil, fish oil, soya oil and the like and such acids as are produced as by-products in chemical processes including for example, tall oil, the by-product resulting from the conversion of wood pulp to paper by the sulfate process, mixtures of any of the above and the like.

Also operable as the liquid modifier compound are the naturally occurring fatty oils having boiling points above about 150°C including, for example, linseed oil, castor oil, tung oil, fish oil, soya oil, and the like.

Suitable esters of a carboxylic acid which may be employed as the liquid modifiers in the present invention include those esters prepared from mono- and polycarboxylic acids having from about 1 to about 20 carbon atoms such as for example, phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150°C and is a liquid at room temperature.

These acid esters may be prepared by condensing an acid having from about 1 to about 20 carbon atoms with a saturated or unsaturated aliphatic alcohol having from about 1 to about 20 carbon atoms, with the proviso that the ester product is a liquid and has a b.p. greater than 150°C.

The term *liquid modifier boiling above about 150°C* includes eutectic mixtures of the previously described classes of compounds which are solids at atmospheric pressure but said eutectic mixtures are a liquid at room temperature and atmospheric pressure which have boiling points above about 150°C. Also included in the definition are those solid compounds of the classes previously described which are dissolved in a liquid member of any of the described classes of compounds having boiling points above about 150°C wherein the resultant solution is a liquid at standard conditions of temperature and pressure and have boiling points at atmospheric pressure above about 150°C.

Substances which are suitably employed as the solid modifier compound (component 3b) in the compositions of the present invention include any solid element, metallic and/or nonmetallic, compound or alloy which does not decompose at a temperature corresponding to the exotherm temperature resulting from the reaction between components 1 and 2 when the components comprising the present invention are blended together with the further proviso that such solid substance has a surface area of less than about 0.2 m$^2$/gram and preferably less than about 0.1 m$^2$/gram and a particle size such that the size of the particle in its minimum dimension is less than about one-fourth inch.

Suitable solid substances which are employed as the solid modifier (component 3b) include, for example, metals such as aluminum, iron, copper, magnesium, silicon, nickel, zinc, lead, titanium, zirconium, alloys thereof such as, bronze, brass, ferrosilicon and the like, mixtures thereof and the like.

Compounds which are suitable as the solid modifier (component 3b) include, for example, oxides of silicon, boron, iron, nickel, copper, tungsten, manganese, molybdenum, vanadium, lead, cobalt, chromium, zinc, mercury and cadmium, and nitrides of silicon, boron, aluminum, titanium, zirconium, mixtures thereof and the like.

Also included as suitable substances for use as component (3b) are the carbides of silicon, boron, iron, tungsten, titanium, zirconium and sulfides of iron, copper, nickel, lead, zinc, mercury and cadmium, mixtures thereof and the like.

Other substances which are suitably employed as the solid modifier, component 3b, include for example, organic substances such as crystalline waxes, solid granular pitches, bitumens, coal and rosins and such polymers as polyethylene, polypropylene, polystyrene, polypropylene, polyvinyl chloride, polymethyl methacrylate, granular polyurethanes, phenolic resins, polyamides, thermoset polyepoxides, alkyds, polytetrafluoroethylene, ABS polymers (acrylonitrile-butadienestyrene) mixtures thereof and the like.

These particulate solids may be irregular in shape or have particulate shapes that are spheres, rectangles, flakes, or fibers and the like.

Suitable carboxylate salts of heavy metals which are employed as the catalysts, component (4), in the present invention include, for example, organo-metal compounds of tin, zinc, lead, mercury, cadimum, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mercury naphthenate, mixtures thereof and the like.

The quenching may be accomplished by such techniques as spraying, immersion, by contacting the surface of the casting and/or mold with the quenching agent in such manner as to rapidly remove heat from the casting, or combinations thereof.

Suitable quenching agents include gases such as carbon dioxide, hydrogen, air, nitrogen, argon, xenon, helium, and the like at about ambient temperatures (about 25°C) and below to about −100°C and such liquids as water, brines, halogenated aliphatic compounds such as methylene chloride, methyl chloroform, and the like, ketones such as acetone, halofluorocarbons such as $CFCl_3$ and the like at temperatures of from ambient and below to about −60°C down to as low as about −100°C.

The quantity of cooling or quenching agent employed and the time duration during which it is employed is dependent upon the mass and thickness of the object being cast and the temperature at which the cooling or quenching agent is applied as well as the thickness and thermal conductivity of the mold material.

Suitable materials from which adequate molds for use in the process of the present invention can be prepared include polymers such as polyolefins, polyolefin copolymers, and the like; polyurethanes, polysiloxane elastomers, polyesters, cured polyepoxides, combinations thereof and the like. It is preferred to employ relatively thin walled molds having low heat capacities and high thermal conductivity such as, for example, copper, aluminum, nickel, alloy steels and the like.

The following examples are illustrative of the present invention and are not to be construed as limiting the scope thereof in any manner.

EXAMPLES 1–7 AND COMPARATIVE EXPERIMENTS A TO F:

In the following examples, a mold for casting ⅜ inch thick rectangular castings having a Mylar film liner positioned such that the quenching agent could be applied so as to surround the casting at the desired time.

In each instance, all of the components except the catalyst were blended together and then the catalyst was added, blended and immediately poured into the mold. After solidification, the quenching agent was employed by surrounding the casting with the quenching agent, unless otherwise indicated.

The quantity and type of components employed as well as the results are given in the following Table I wherein definitions of terms employed therein are:

*Solidification Time* was the time in seconds from catalyst addition and mixing until the composition solidified.

*Quenching Agent Applied, Sec.* was the time in seconds from catalyst addition and mixing until the quenching agent was employed.

*Time Casting Removed From Mold* was the time from catalyst addition and mixing until the casting was removed from the mold.

*Temperature/Time after Quenching* was the temperature of the casting at the indicated time measured from the instant the quenching agent was employed, except that when no quenching agent was employed it is the temperature of the casting at the indicated time measured from the time of catalyst addition and mixing.

POLYOL A was the reaction product of glycerine propylene oxide in a molar ratio of about 1:3 respectively and having an OH equivalent weight of about 87.

POLYOL B was the reaction product of glycerine with ethylene oxide in a molar ratio of about 1:3 respectively and having an OH equivalent weight of about 79.

POLYOL C was the reaction product of pentaerythritol with propylene oxide in a molar ratio of about 1:5 respectively and having an OH equivalent weight of about 76.

POLYOL D was the reaction product of sucrose with propylene oxide in a molar ratio of about 1:15 respectively and having an OH equivalent weight of about 156.

POLYOL E was dipropylene glycol having an OH equivalent weight of about 67.

POLYISOCYANATE A was xylylene diisocyanate having an NCO equivalent weight of about 93.

POLYISOCYANATE B was an 80/20 mixture of 2,4-/2,6-toluene diisocyanate, having an NCO equivalent weight of about 87.

POLYISOCYANATE C was isophorone diisocyanate having an NCO equivalent weight of about 111.

POLYISOCYANATE D was hydrogenated methylene dianiline diisocyanate having an NCO equivalent weight of about 128.

CATALYST A was commercially available lead octoate containing 24 percent lead.

CATALYST B was a 10 percent solution of catalyst A in Varsol, an aliphatic petroleum solvent commercially available from Humble Oil & Refining Co.

QUENCHING AGENT A was water at ambient temperature, about 25°C.

QUENCHING AGENT B was methylene chloride cooled to −40°C with dry ice.

TABLE I

| | Example 1 | Comparative Experiment A | Example 2 | Comparative Experiment B | Example 3 | Comparative Experiment C |
|---|---|---|---|---|---|---|
| Polyol, type/grams | A/60 | A/60 | B/60 | B/60 | C/70 | C/70 |
| Polyisocyanate, type/grams | A/64 | A/64 | B/66 | B/70 | B/70 | B/70 |
| Catalyst, type/cc | A/0.8 | A/0.8 | A/0.1 | A/0.1 | A/0.1 | A/0.1 |
| Solidification time, sec | 20 | 20 | | | 35 | 35 |
| Temperature of casting before quenching, °C | 230 | 230 | | 240 | 180 | 235 |
| Quenching agent: | | | | | | |
| Type/temperature, °C | A/25 | None | A/25 | None | A/25 | None |
| Applied, sec | 30 | | 20 | | 40 | |
| Temp./time after quenching, °C/sec | 200/60 | 210/180 | >200/60 | 200/150 | 150/55 | |
| Time casting removed from mold, sec | 120 | | 180 | 180 | 120 | 150 |
| Density, g./cc | >1 | 0.61 | >1.12 | 0.43 | 1.14 | 0.46 |
| Remarks | Rigid, transparent, bubble-free product. | Casting swelled, distorted and cracked. | Rigid, bubble-free product. | Casting swelled, distorted and product. | Rigid, transparent, bubble-free product. | Casting swelled, distorted and cracked. |

| | Example 4 | Comparative Experiment D | Example 5 [1] | Comparative Experiment E [1] | Comparative Experiment F [1] | Example 6 | Example 7 |
|---|---|---|---|---|---|---|---|
| Polyol, type/grams | D[2]/28 E[2]/42 | D/28 E/42 | A/30 | A/30 | A/30 | B/60 | B/54 |
| Polyisocyanate, type/grams | B/70 | B/70 | B/30 | B/30 | B/30 | C/72 | D/88 |
| Catalyst, type/cc | B/0.1 | B/0.1 | A/0.1 | A/0.1 | A/0.1 | A/0.1 | A/1.0 |
| Solidification time, sec | | | 20 | 20 | 20 | | |
| Temp. of casting before quenching, °C | | | | | | | |

TABLE I—Continued

| | Example 4 | Comparative Experiment D | Example 5 [1] | Comparative Experiment E [1] | Comparative Experiment F [1] | Example 6 | Example 7 |
|---|---|---|---|---|---|---|---|
| Quenching agent: | | | | | | | |
| Type/temp., °C | A/25 | None | B/−40 | A/25 | None | A/25 | A/25 |
| Applied, sec | | | 25 | 20–30 | | | |
| Temp./time after quenching, °C./sec. | | | | | | | |
| Time casting removed from mold, sec | 90 | | 150 | 120 | | 180 | |
| Density, g./cc | 1.15 | 0.47 | 1.06 | 0.88 | 0.54 | >1 | >1. |
| Remarks | Rigid, bubble-free product. | Casting swelled, distorted and cracked. | Rigid, bubble-free product. | Casting swelled slightly. | Casting swelled, distorted and cracked. | Rigid, bubble-free product. | Transparent rigid, bubble-free casting. |

[1] Thickness of casting was ⅝ in. instead of ⅜ in.
[2] The average functionality of this mixture was about 2.5 and the average equivalent weight was about 87.

EXAMPLE 8

Part A — Example of the Present Invention

A mixture having the following composition was prepared as in Examples 1–7.

60 grams Polyol A
60 grams Polyisocyanate B
0.1 cc Catalyst A

The mixture was poured into a ¼ in. deep Mylar tray. Solidification of the mixture occurred about 20 seconds after catalyst addition. Within about 25 seconds, after catalyst addition, the mold containing the solidified casting was immersed in a container containing 25°C water. The ¼ in. thick rigid, transparent product had a density of 1.1 gram/cc. Physical properties of the product were obtained and are reported in Table II as Sample A.

Part B — (Comparison with Prior Art)

A composition disclosed in U.S. Pat. No. 3,378,511 was prepared. This composition consisted of the following.

50 grams of Polyol A
50 grams of Polyisocyanate B
50 grams of dioctylphthalate
0.2 cc of Catalyst A This composition was cast as in Part A above except that it was not quenched in water. The properties of this ¼ inch casting are reported in Table II as Sample B.

TABLE II

| | Sample A | Sample B |
|---|---|---|
| Tensile Strength, psi. | 14,130 | 7,625 |
| Flexural modulus, psi. | 713,000 | 172,000 |
| Barcol Hardness employing a No. 934–1 tester | 52 | <2 |

EXAMPLE 9

The procedure of Example 8A was followed employing a Mylar tray having a depth of 0.2 in. and the following composition.

50 grams of Polyol A
50 grams oF Polyisocyanate B
0.2 cc of Catalyst A

The mixture solidified within 25 seconds after catalyst addition and was then immersed in 25°C water. The properties of the casting were obtained and are reported in Table III.

EXAMPLE 10

The procedure of Example 9 was follOwed employing the following composition.

73 grams of Polyol A
73 grams of Polyisocyanate B
30 grams of dioctyl phthalate (this corresponds to 17 percent by weight)
0.5 cc of Catalyst A The mixture solidified within about 20 seconds and was then immersed in 25°C water. The properties of the casting were obtained and are reported in Table III.

TABLE III

| | Example 9 | Example 10 |
|---|---|---|
| Tensile Strength, psi | 15,687 | 11,983 |
| Elongation, % | 7 | 10 |

EXAMPLE 11

Part A (Example of the Present Invention)

Same procedure as in Example 8A employing a ½ inch deep Mylar tray and the following composition.

50 grams Polyol A
50 grams Polyisocyanate B
15 grams Dioctylphthalate
0.8 grams Catalyst A The mixture solidified within 20 seconds after catalyst addition and was immediately immersed in 25°C water. The ½ inch casting was demolded 120 seconds after catalyst addition and was a rigid, bubble-free sheet having a density of 1.14 g/cc.

Part B

Part A above was repeated except that the casting was not quenched by immersion in water. The casting distorted and swelled to a thickness ranging from ⅝ inch to 1⅜ inch and had a density of 0.79 g/cc. A cut section of the casting revealed it to contain voids up to about one-eighth inch in diameter.

EXAMPLE 12

Same procedure as in Example 8A except that the mold was a ⅜ inch deep tray constructed of 0.2 mm copper sheet. The composition employed was as follows.

50 grams Polyol A
50 grams Polyisocyanate B
12 grams Tall Oil (FA-2 grade available from Arizona Chemical Co.)
0.5 cc of stannous octoate (commercially available from M and T Chemicals as T–9).

The mixture solidified within about 25 seconds after catalyst addition and at 35 seconds after catalyst addition the tray containing the casting was immersed in 25°C water. The opaque rigid casting had a density of >1 gram/cc.

EXAMPLE 13

Same procedure as in Example 8A employing a ¼ inch deep tray constructed of 0.1 mm thick aluminum sheet. The following composition was employed.

50 grams of Polyol A
50 grams of Polyisocyanate B 0.4 cc of dibutyltin dilaurate The mixture solidified within about 40 seconds after catalyst addition at which time a continuous relatively high velocity stream of air at ambient temperature was directed across the surface of the casting for about 2 minutes. The resultant rigid, bubble-free sheet had a density of > 1 gram/cc.

What is claimed is:

1. A process for preparing rapid-setting non-cellular polyurethane castings having at least one dimension of less than about ¾ inch which comprises
   A. admixing a composition comprising
      1. a polyether polyol having an average functionality of from 2 to about 8 and an equivalent weight of from about 31 to about 150,
      2. an organic polyisocyanate,
      3. from about 0 to about 18 percent by weight based upon the combined weight of components (1), (2) and (3) of a compound selected from
         a. a liquid modifier compound having a boiling point of at least about 150°C,
         b. a solid modifier compound having a surface area less than about 0.1 m²/gram and
         c. mixtures thereof,
      4. an organometallic catalyst,
      wherein the quantities of (1) and (2) are such as to provide an NCO:OH ratio of from about 0.8:1 to about 1.5:1 with the proviso that when the average functionality of components (1) or (2) is about 2, then the average functionality of the other component is at least about 2.5; with the further proviso that when component (1) consists solely of an amine initiated polyether polyol, no catalyst, component (4) is required; otherwise, component (4) is employed in quantities of from about 0.01 to about 2 percent by weight of the combined weights of components (1), (2) and (3);
   B. rapidly pouring the mixture into a suitable mold whereupon the composition rapidly solidifies, and
   C. quenching the solidified composition within less than about 30 seconds after solidification has occurred by contacting the solidified composition or the mold containing the solidified composition with a cooling fluid for a time sufficient to prevent undesired swelling and/or distortion of the casting.

2. The process of claim 1 wherein the equivalent weight of component (1) is from about 53 to about 130.

3. The process of claim 2 wherein component (1) has an average functionality of about 3 and component (2) is an organic diisocyanate.

4. The process of claim 3 wherein component (1) is the reaction product of glycerine with propylene oxide.

5. The process of claim 3 wherein component (1) is the reaction product of glycerine with ethylene oxide.

6. The process of claim 3 wherein the polyisocyanate is toluenediisocyanate.

7. The process of claim 3 wherein the quenching agent is water.

8. The process of claim 3 wherein the quenching agent is methylene chloride.

9. The process of claim 3 wherein the quenching agent is air.

* * * * *

PO-1050
(5/69)

UNITED STATES PATENT OFFICE
CERTIFICATE OF CORRECTION

Patent No. 3,773,697　　　　　　　　　Dated Nov. 20, 1973

Inventor(s)　　Franciszek Olstowski

It is certified that error appears in the above-identified patent and that said Letters Patent are hereby corrected as shown below:

Col. 7, l. 4, delete "1.108.921."

Col. 9 and 10, Table I, under Comp. Expt. B opposite Polyisocyanate, change "B/70" to --B/66-- and opposite Remarks, change "product" to --cracked--.

Col. 9 and 10, Table I, under Example 6 opposite Catalyst, change "A/0.1" to --A/1.0--.

Col. 11, l. 55, change "oF" to --of--.

Col. 11, l. 62, change "foll0wed" to --followed--.

Col. 12, l. 42, change "1 3/8" to -- 1 1/8 --.

Signed and sealed this 31st day of December 1974.

(SEAL)
Attest:

McCOY M. GIBSON JR.　　　　　　　　C. MARSHALL DANN
Attesting Officer　　　　　　　　　　Commissioner of Patents